(12) United States Patent
Sitou

(10) Patent No.: US 8,754,567 B2
(45) Date of Patent: Jun. 17, 2014

(54) ELECTRIC GENERATOR

(76) Inventor: Kachon Sitou, San Leandro, CA (US)

( * ) Notice: Subject to any disclaimer, the term of this patent is extended or adjusted under 35 U.S.C. 154(b) by 279 days.

(21) Appl. No.: 13/440,816

(22) Filed: Apr. 5, 2012

(65) Prior Publication Data

US 2013/0264825 A1    Oct. 10, 2013

(51) Int. Cl.
*H02K 1/00* (2006.01)

(52) U.S. Cl.
USPC ............ 310/261.1; 310/265; 290/1 R; 290/54

(58) Field of Classification Search
USPC ............ 310/261.1, 265, 266; 290/1 R, 54–56
See application file for complete search history.

(56) References Cited

U.S. PATENT DOCUMENTS

2010/0327604 A1*  12/2010  Zhu et al. ...................... 290/1 R

* cited by examiner

*Primary Examiner* — Tran Nguyen
(74) *Attorney, Agent, or Firm* — Venture Pacific Law, PC

(57) ABSTRACT

An electric generator comprises a line; a cage having a plurality of magnets secured to the cage, wherein the cage is hanging from the line; and conductive coils surrounding the cage, wherein the cage receives a force causing the cage to rotate and wherein electricity is generated at the conductive coils when the cage rotates.

18 Claims, 7 Drawing Sheets

ELECTRIC GENERATOR

FIELD OF INVENTION

The present invention relates to electricity generation and, in particular, to an electric generator that converts mechanical energy from a twisted line to electrical energy.

BACKGROUND

Electric generators are based on electromagnetic induction, where voltage is induced in the conductor whenever a conductor moves relative to a magnetic field. Particularly, if a magnet is rotating inside a coil, alternating current ("AC") voltage is induced in the coil. The induced voltage (called electromotive force) creates a current through an external circuit connected to the coil terminals resulting in the current being delivered to a load. In this manner, kinetic energy used in rotating the source of the magnetic field is converted into electricity. The current flowing through the load in turn creates a magnetic field that opposes the change in the flux of the coil, thereby opposing the motion of the source of the magnetic field. The higher the current, the larger the force that must be applied to rotate the magnet to keep the rotation of the magnet from slowing down. The source of the mechanical energy may be from a turbine steam engine, water falling through a turbine or waterwheel, an internal combustion engine, a wind turbine, a hand crank, compressed air, or any other source of mechanical energy.

Generally, current electric generators have many drawbacks. For instance, such drawbacks include having a complex design, being expensive to manufacture and operate, using environmentally unfriendly fossil fuels, and generating excessive heat that can damage the respective generators. In addition, society's increasing power demands and environmental concerns have encouraged developing new electric generators to provide electricity in an environmentally friendly manner. Therefore, new electric generators that minimally rely on fossil fuels for generating mechanical energy are desired.

SUMMARY OF INVENTION

An object of this invention is to provide an electric generator that uses a twisted line to generate mechanical energy for electricity generation.

Another object of this invention is to provide an electric generator that is cost effective to operate.

Yet another object of this invention is to provide an electric generator that minimizes the use of fossil fuels for generating electricity.

Briefly, the present invention discloses an electric generator comprising a line; a cage having a plurality of magnets secured to the cage, wherein the cage is hanging from the line; and conductive coils surrounding the cage, wherein the cage receives a force causing the cage to rotate and wherein electricity is generated at the conductive coils when the cage rotates.

An advantage of this invention is that an electric generator that uses a twisted line to generate mechanical energy for electricity generation is provided.

Another advantage of this invention is that an electric generator that is cost effective to operate is provided.

Yet another advantage of this invention is that an electric generator that minimizes the use of fossil fuels for generating electricity is provided.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

Figure 1:
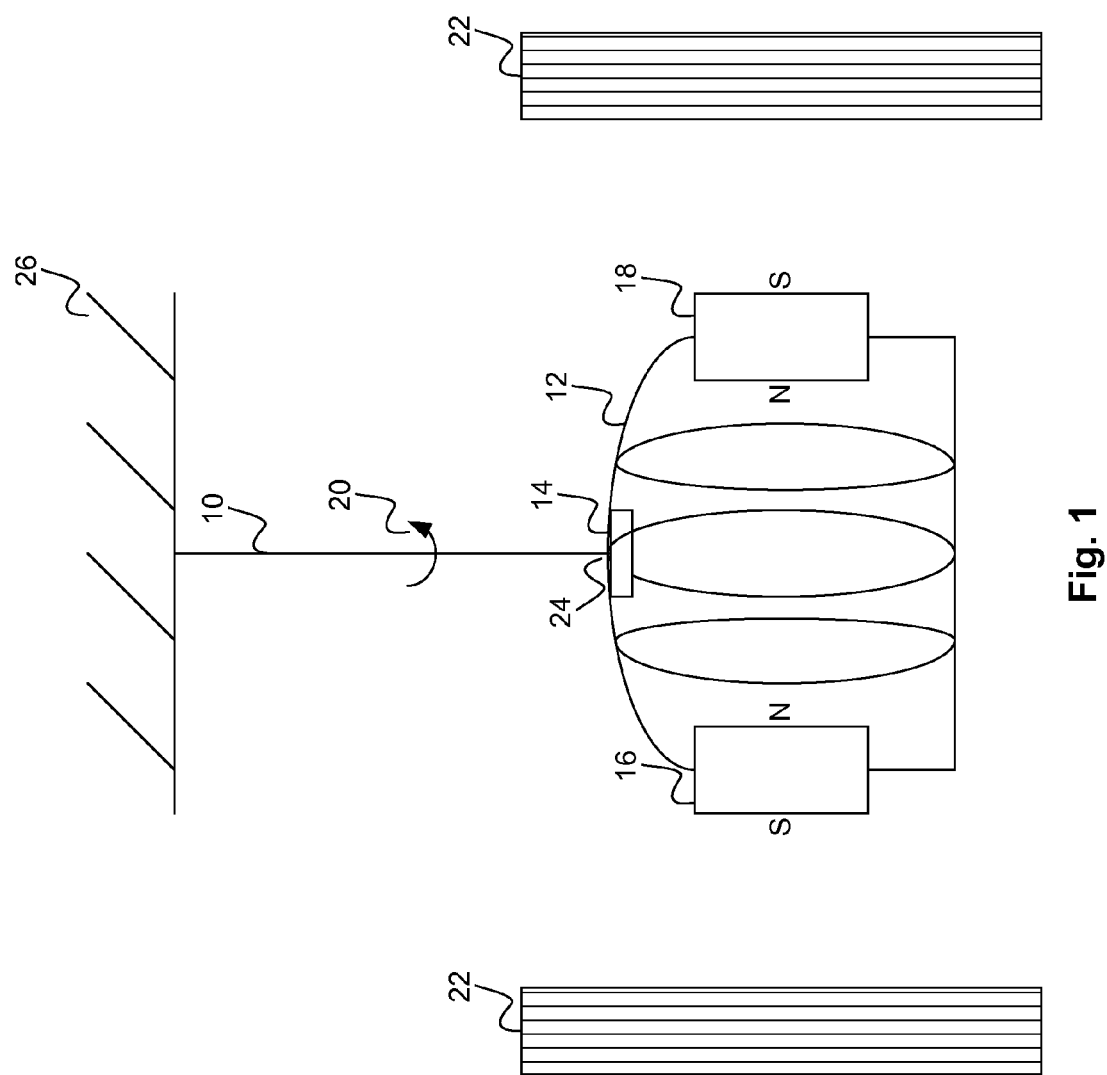
FIG. 1 illustrates a generator of the present invention for generating electricity by hanging a cage with magnets from a line and rotating the cage to generate an electrical current.

FIG. 1 illustrates a generator of the present invention for generating electricity by hanging a cage with magnets from a line and rotating the cage to generate an electrical current. A generator comprises a line 10, a cage 12 having magnets 16 and 18, a connector 14 to couple the line 10 and the cage 12 together, and conductive coils 22. The line 10 is secured to a support 26 to allow the cage 12 to freely hang from the line 10. The cage 12 is also free to rotate about the line 10 when the line 10 rotates, e.g., as the line 10 unwinds. The support 26 can be a beam, pulley, scaffolding, ceiling, or other object to which the line 10 is secured.

When the cage 12 rotates about the line 10, the magnets 16 and 18 rotate along with the cage 12 since the magnets 16 and 18 are secured to the cage 12. As the cage 12 rotates in a rotational direction 20, a rotating magnetic field is generated by the rotating magnets 16 and 18, which in turn generates an electrical current in the conductive coils (a cross-sectional view) 22 when the conductive coils 22 are connected across a load. Thereby, electricity is generated when the cage 12 rotates.

The rotation about the line 10 can be generated by first twisting the line 10 and then unwinding the twisted line 10 to release the potential energy. When the line 10 unwinds, the cage 12 will rotate since the line 10 is secured to the cage 12 by the connector 14. The connector 14 can be securely fastened to the line 10. Also, the connector 14 is fastened within the cage 12 (or fastened to the bottom of the cage 12). The line 10 can pass through the top wall of the cage 12 through a hole 24 on top of the cage 12. The connector 14 is wider than the hole 24 such that when the cage 12 is hanging from the line 10, the connector 14 can engage the cage 12 and keep the cage 12 from falling. Alternatively, when the cage 12 is supported by another means (e.g., by the cage 12 being laid on a platform), the line 10 freely dangles within the cage 12.

The line 10 can be constructed out of a synthetic material, e.g. a nylon rope, an organic material, a metallic material, or a combination of materials thereof. The line 10 should be strong enough to withstand a torsional force applied to the line 10 when the line 10 is twisted. The line 10 should also be strong enough to support the weight of the cage 12 when the cage 12 is hanging from the line 10.

The length of the line 10 can depend on the amount of rotational force imparted to the cage 12 and the amount of time to impart that rotational force. For instance, the longer the line 10, the greater the amount of time that a rotational force can be applied on the cage 12 since the line 10 can have more twists in the line 10. The length of the line 10 can also be selected based upon the size of the electric generator, the material and construction of the line 10, and the amount of rotational force needed to be exerted on the cage 12.

The cage 12 can have any number of magnets, where the magnets can be magnetized objects or electromagnets. In this embodiment, the cage 12 has the magnets 16 and 18, where the magnets 16 and 18 are preferably equidistant from each other along the circumference of a cross section of the cage 12. The magnets 16 and 18 are arranged along the cage 12 such that the north magnetic poles of the magnets 16 and 18 are facing inward to the cage 12 and the south magnetic poles of the magnets 16 and 18 are facing outward from the cage 12. Alternatively, other configurations for the magnets can also be used, e.g., where the north magnetic poles of the magnets 16 and 18 are facing outward from the cage 12 and the south magnetic poles of the magnets 16 and 18 are facing inward to the cage 12.

The cage 12 can have various shapes, e.g., a dome shape or other conical shape, with a hollow core and with one of the sides of the cage 12 completely open. The cage 12 can have bars forming the shape of the cage 12 with no bars on the open side of the cage 12. The cage 12 may also have alternative wall configurations, where the outer perimeter of the cage 12 is entirely solid, instead of having bars. The hollow core allows the line 10 and connector 14 to freely dangle within the hollow core of the cage 12 when the cage 12 is supported by other means, e.g., a platform.

When the cage 12 is hanging from the line 10, the cage 12 and the line 10 are secured together via the connector 14. As the line 10 unwinds, the cage 12 rotates since it is secured to one end of the line 10. The other end of the line 10 is secured to the support 26 and, in this embodiment, does not rotate at the connection with the support 26. Thus, the rotational force from the line 10 is solely imparted to rotate the cage 12. The conductive coils 22 are arranged surrounding the cage 12 in various configurations to channel the generated current from the rotating magnetic field.

Figure 2:
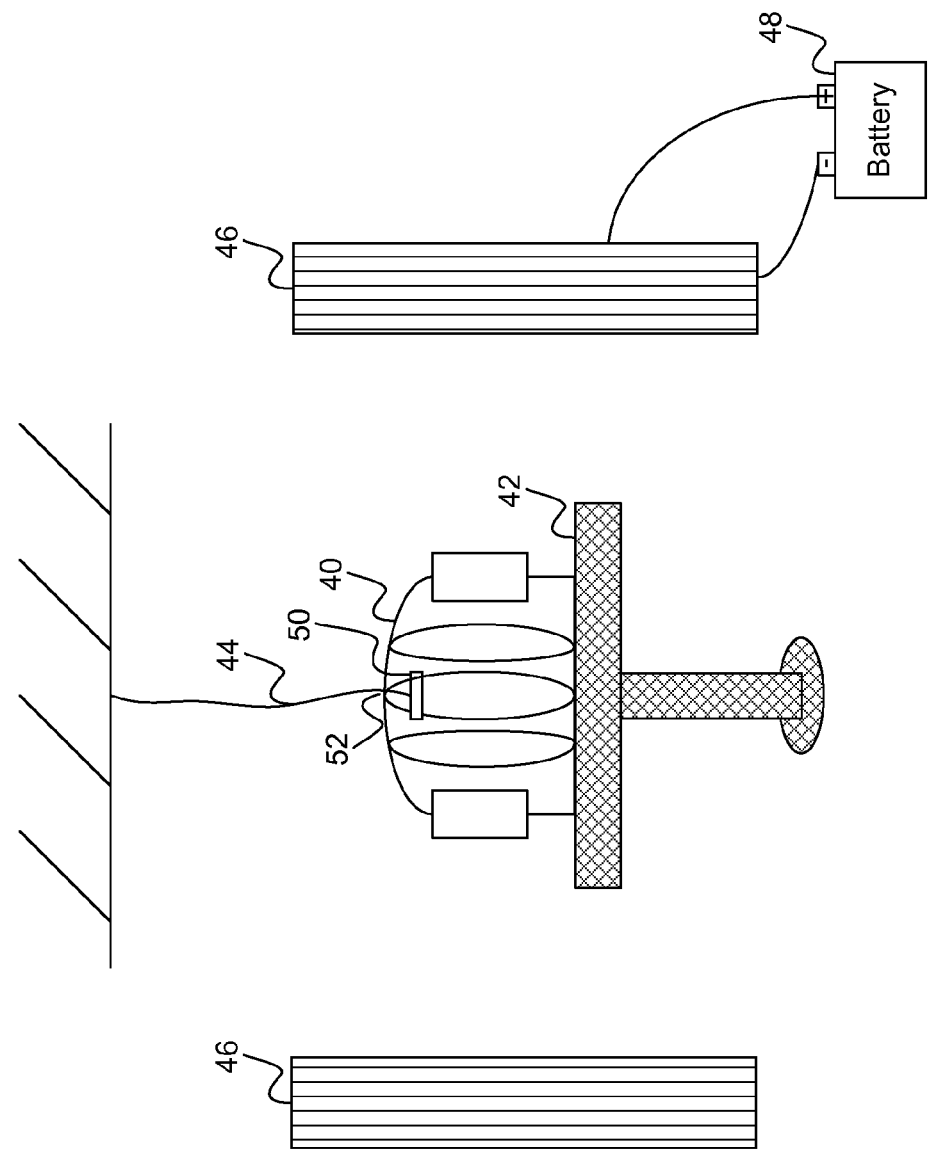
FIG. 2 illustrates a generator of the present invention for generating electricity, where a platform is used to support a hanging rotatable cage with magnets.

FIG. 2 illustrates a generator of the present invention for generating electricity, where a platform is used to support a hanging rotatable cage with magnets. A generator of the present invention comprises a cage 40 with magnets secured to the cage 40, a platform 42 with the elevation of the platform 42 being adjustable, a line 44, conductive coils 46, an electrical storage unit 48, e.g., a battery, and a connector 50. The cage 40 can be supported by the platform 42 to relieve the tension on the line 44 and unwind the line 44. Since there is a hole 52 on top of the cage 40, the line 44 and the connector 50 can dangle and rotate within the cage 40. The conductive coils 46 are connected to the electrical storage unit 48 for storing the energy generated when the cage 40 is rotating.

Figure 3:
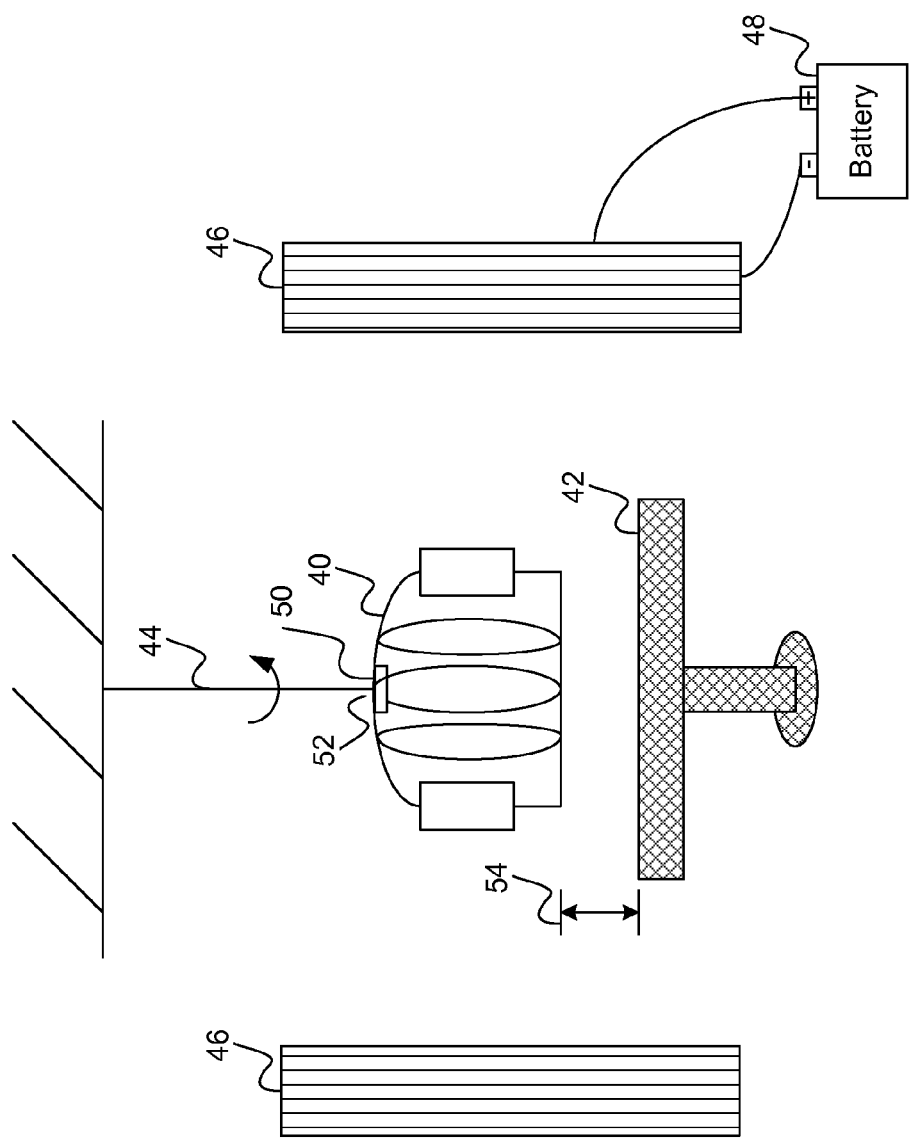
FIG. 3 illustrates a generator of the present invention for generating electricity, where a platform is lowered to allow a rotatable cage with magnets to rotate about a line.

FIG. 3 illustrates a generator of the present invention for generating electricity, where a platform is lowered to allow a rotatable cage with magnets to rotate. When the platform 42 is released from supporting the cage 40, the line 44 is pulled taut by the weight of the cage 40 and the cage 40 hangs from the line 44. Thus, the cage 40 is solely supported by the line 44. There can be a space 54 between the cage 40 and the platform 42 to prevent the platform 42 from obstructing the rotation of the cage 40. Once the cage 40 is fully supported by the line 44, the connector 50 latches to the interior of the cage 40 (or the bottom of the cage 40) to securely couple the cage 40 to the line 44. The line 44 will begin to unwind exerting a rotational force on the connector 50, which is further exerted on the cage 40. This rotational force causes the cage 40 to rotate.

In order to enhance the connection between the connector 50 and the cage 40, the cage 40 can have one or more grooves (not shown) for the connector 50 to interconnect with when the cage 40 is hanging from the line 44. The connector 50 imparts rotational force on the cage 40 since the connector 50 is securely interconnected with the groves of the cage 40. When the connector 50 rotates due to the rotational force, the cage 40 rotates accordingly. As the cage 40 rotates, an electric current is driven through conductive coils 46 and stored in the electrical storage unit 48.

Figure 4:
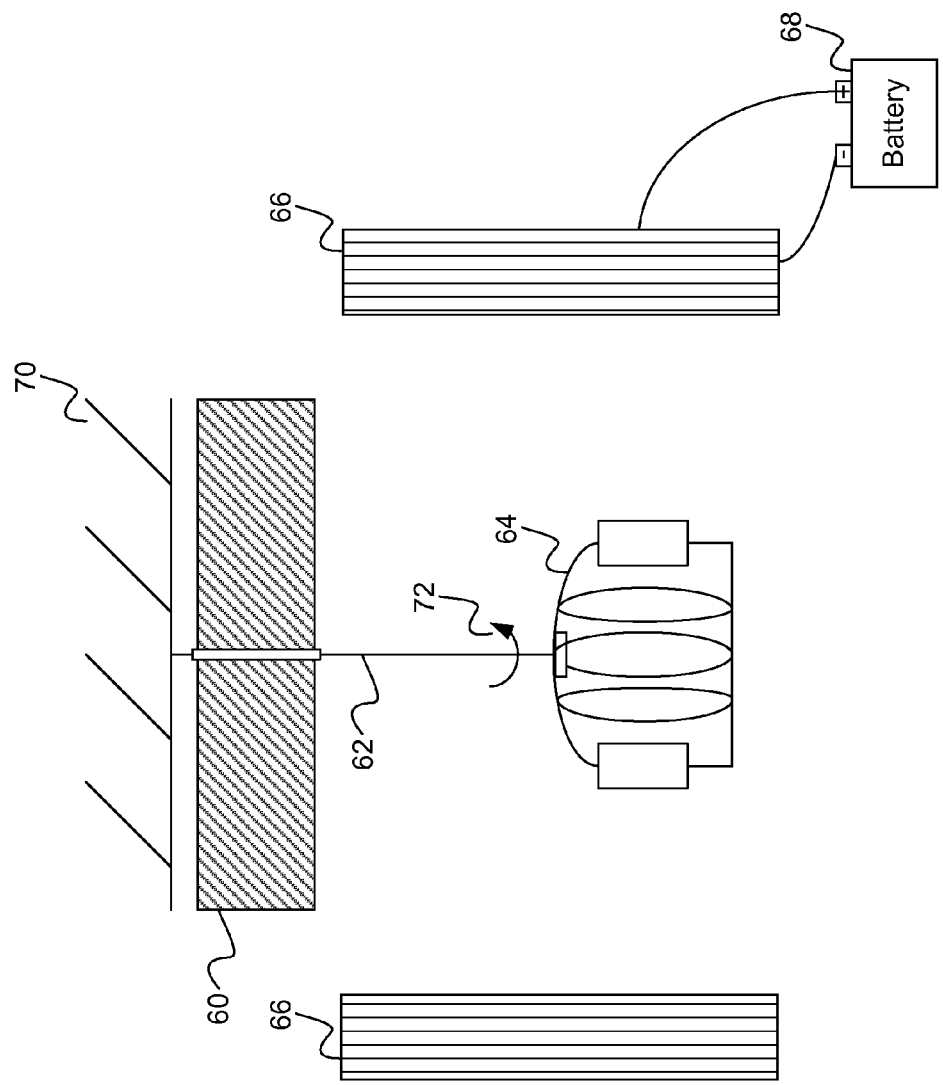
FIG. 4 illustrates a generator of the present invention for generating electricity by rotating a cage with magnets, where a fin is secured to a line that the cage hangs from to provide rotational force on the line and the cage.

FIG. 4 illustrates a generator of the present invention for generating electricity by rotating a cage with magnets, where a fin is secured onto a line that the cage hangs from to provide rotational force on the cage. A generator of the present invention comprises a cage 64 with several magnets secured to the cage 64, a line 62 for hanging the cage 64 from, a fin 60 that is secured to the line 62 to provide the rotational force on the line 62 and the cage 64, and conductive coils 66.

The line 62 and the cage 64 are secured to each other and the fin 60 is secured to the line 62. The fin 60 can be a single fin or a plurality of fins arranged in a turbine-like arrangement. The fin 60 can cause the line 62 to rotate when air pressure, liquid pressure, or other sources deflect the fin 60 to produce the rotational force on the line 62. The line 62 is rotatably secured to a support 70. This allows the line 62 to freely rotate about a lengthwise axis of the line 62 and along a rotational direction 72. The line 62 rotates as the fin 60 rotates about the line 62. The cage 64 also starts to rotate since the cage 64 is secured to the rotating line 62. The line 62 should be torsionally stiff so that the rotational force generated by the fin 60 is applied to the cage 64, as opposed to being used to twist the line 62. Once the cage 64 is rotating, a current is generated at the conductive coils 66 and can be stored in the electrical storage unit 68.

Figure 5:
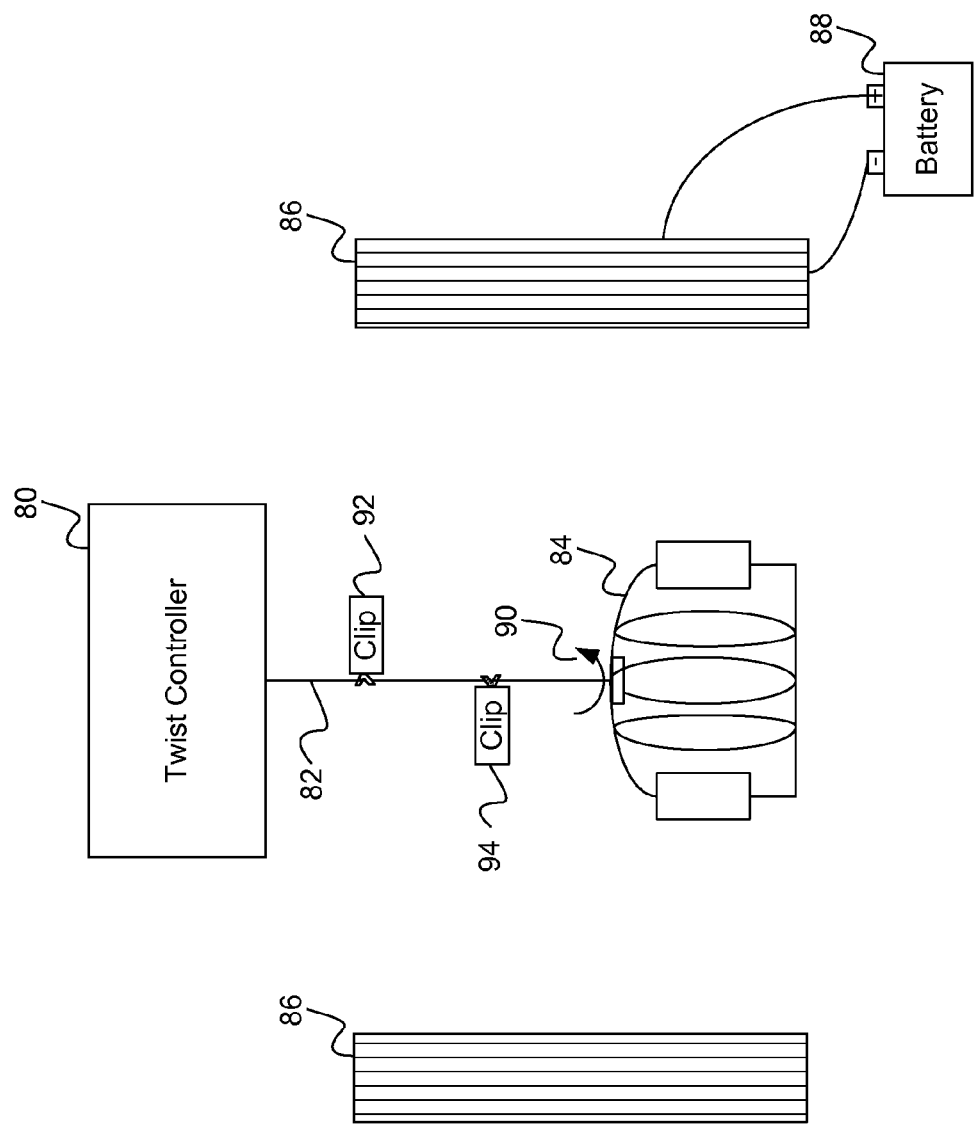
FIG. 5 illustrates a generator of the present invention for generating electricity by rotating a cage with magnets, where a twist controller is secured onto a line that the rotating cage hangs from to provide rotational force on the cage.

FIG. 5 illustrates a generator of the present invention for generating electricity by rotating a cage with magnets, where a twist controller is secured onto a line that suspends the rotating cage to provide rotational force on the cage. A generator of the present invention comprises a twist controller 80, a line 82, a cage 84 having magnets secured to the cage 84, conductive coils 86, an electrical storage unit 88, and two clips 92 and 94. The twist controller 80 and the two clips 92 and 94 can aid in generating a rotational force on the cage 84 by twisting the line 82, and then using the torsional force created by the twisted line 82 to rotate the cage 84 when the line 82 unwinds. The twist controller 80 can be any machine or apparatus for twisting the line 82.

To wind the line 82, the clip 94 is locked, i.e., the clip 94 is secured, to a proximal portion of the line 82 that is proximal to the cage 84. The locked clip 94 prevents the cage 84 from rotating as the line 82 is twisted by the twist controller 80. Thus, the twist controller 80 can twist the line 82 in an opposite rotational direction from a rotational direction 90. The clip 92 is unlocked, i.e., the clip 92 is not secured and not in contact with the line 82.

To rotate the cage 84, the clip 92 can be locked, i.e., the clip 92 is secured, to a distal portion of the line 82 that is distal to the cage 84. The locked clip 92 prevents the distal portion of the line 82 from rotating when the cage 84 is rotating. The clip 94 is unlocked, i.e., the clip 94 is no longer secured and in contact with the line 82. Since the clip 94 is unlocked, the twisted line 82 unwinds causing the cage 84 to rotate in the rotational direction 90. As the cage 84 rotates, electricity is generated on the conductive coils 86. The generated electricity can be stored in the electrical storage unit 88.

In alternative embodiments, the clip 92 can be incorporated into the twist controller 80 such that the twist controller can switch between winding the line 82 and securing the line 82. When the twist controller 80 secures the line 82, then the distal end of the line 82 from the cage 84 does not rotate and provides a secured end to allow the cage 84 to rotate. Furthermore, the clips 92 and 94 can be implemented by a spring loaded clip, an air compression clip, a hydraulic clip, or other means for firmly securing the portion of the line 82 from twisting.

There reaches a point when the rotations of the cage 84 begin to wind the line 82 along the first rotational direction 90, until the torsional force of the twisted line 82 stops the cage 84 from rotating along the first rotational direction 90. At this point, the clip 94 is locked and the clip 92 is unlocked allowing the line 82 to unwind without effecting the rotational direction of the cage 84. Once the line 82 is unwound, the electric generator starts back at the first step, in which the line 82 is wound in the opposite rotational direction to the rotational direction 90. Additional clips can be added to the embodiment to provide further operational control of the line in twisting and releasing of the line.

Figure 6:
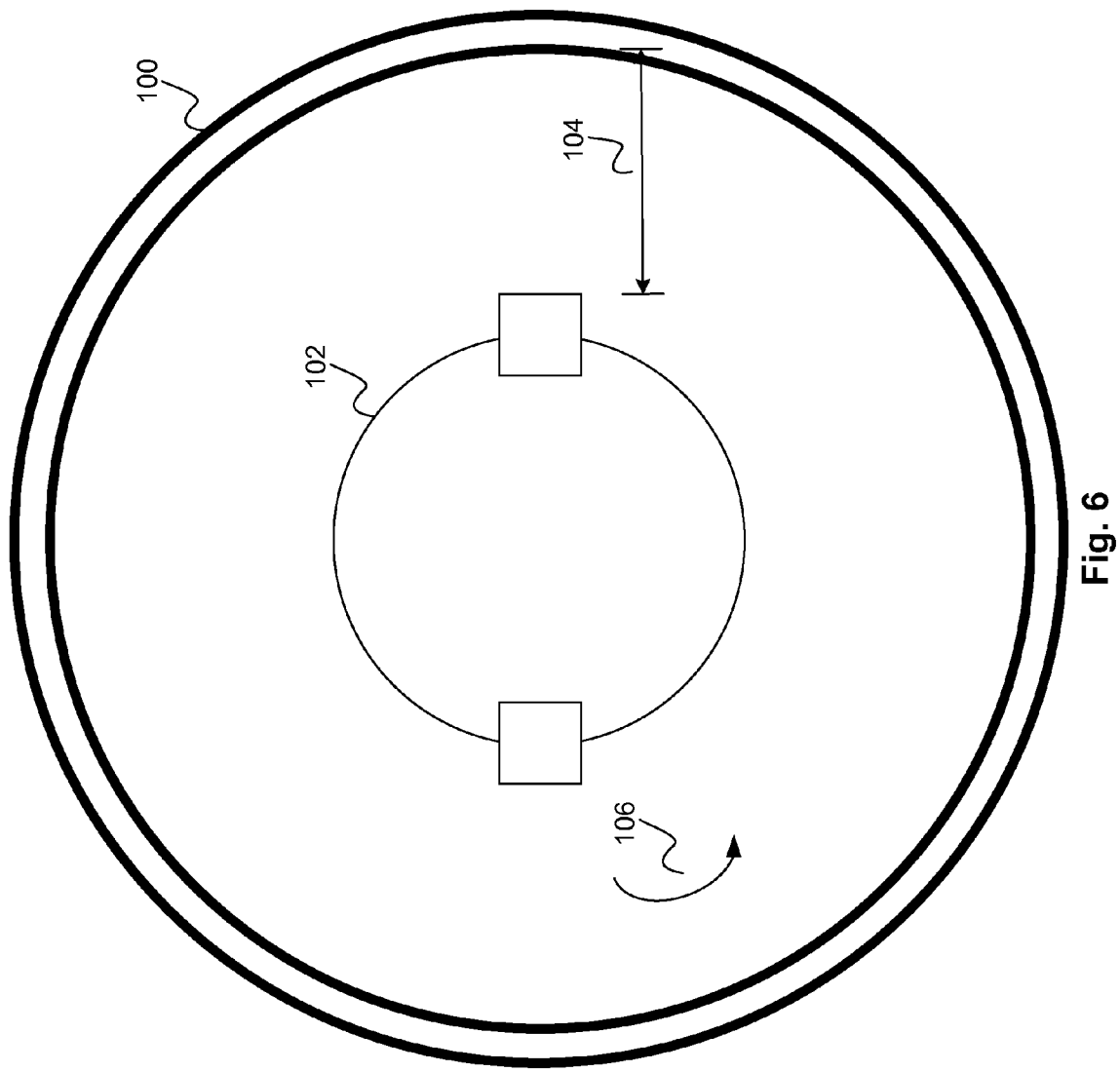
FIG. 6 illustrates a top view of a generator of the present invention for generating electricity.

FIG. 6 illustrates a top view of a generator of the present invention. In a top view of an electric generator of the present invention, a cage 102 can have a circular cross section when the cage 102 is conical in shape. The conductive coils 100 surround the cage 102 and can be spaced from the cage 102 a predefined distance 104 away from the cage 102. The predefined distance can be set as required to maximize the amount of current generated at the conductive coils 100. In a preferred embodiment, the conductive coils 100 and the cage 102 are spaced as close as possible without the conductive coils 100 obstructing the rotation of the cage 102 along a rotational direction 106.

Figure 7:
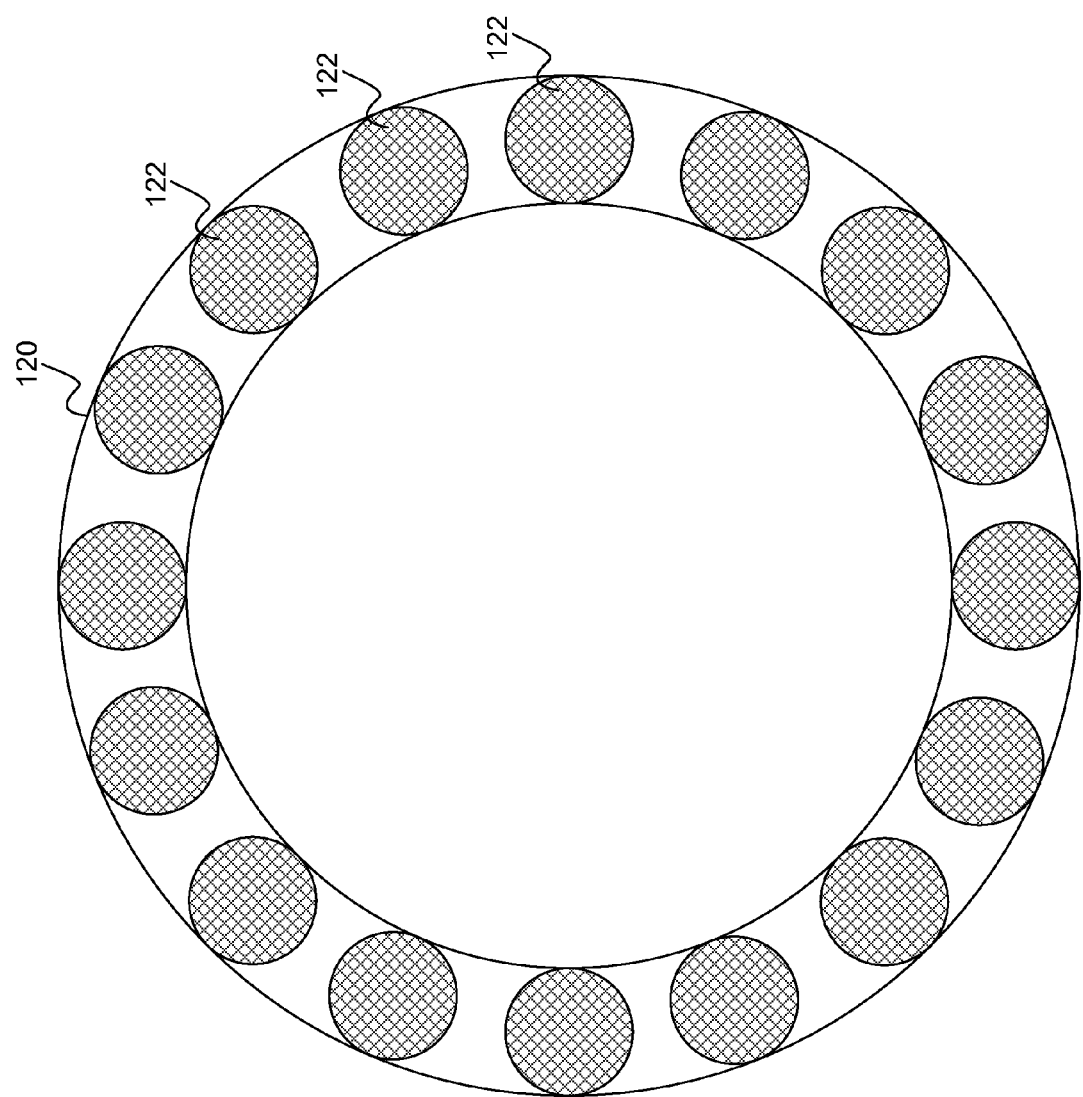
FIG. 7 illustrates a top view of conductive coils of a generator of the present invention for generating electricity, where the generated electricity can be driven through the conductive coils.

FIG. 7 illustrates a top view of conductive coils of a generator of the present invention for driving the generated electrical current through. Conductive coils 120 can have several conductive rods 122. Each of the conductive rods 122 can be a bundle of coils, rather than solid rods. The configuration of the conductive rods 122 are such that the conductive rods 122 are perpendicular to the rotational direction of the cage of the electric generator, where the ends of the conductive rods 122 are connected together. The top ends for the conductive rods 122 are connected together to form a first connection and the bottom ends of the conductive rods 122 are connected together to form a second connection. The two connections can be further connected across a load to make a closed system or an electrical storage unit to store the generated electricity.

In other embodiments of the present invention, the conductive coils can be several loops of coils that are connected in series and wrapped around a predefined distance from the cage. The serially connected coils can have two ends that are connected across a load or an electrical storage unit to make a closed system. In addition, other known coil configurations for electric generators can be used in the present invention to maximize the amount of electricity generated by the rotating cage.

While the present invention has been described with reference to certain preferred embodiments or apparatuses, it is to be understood that the present invention is not limited to such specific embodiments or apparatuses. Rather, it is the inventor's contention that the invention be understood and construed in its broadest meaning as reflected by the following claims. Thus, these claims are to be understood as incorporating not only the preferred apparatuses described herein but all those other and further alterations and modifications as would be apparent to those of ordinary skilled in the art.

I claim:

1. An electric generator, comprising a line;
    a rotatable cage having a plurality of magnets secured to the cage, wherein the rotatable cage is hanging from the line;
    a twisting means for twisting the line to create a releasable rotational force;
    an adjustable supporting means for releasably holding the line in a twisted state and the rotatable cage in a non-rotatable state; and
    conductive coils surrounding the rotatable cage,
    wherein the rotatable cage receives the rotational force causing the rotatable cage to rotate and wherein electricity is generated at the conductive coils when the rotatable cage rotates.

2. The electric generator of claim 1 wherein the line is twisted and wherein a rotational force on the rotatable cage is produced by the unwinding of the twisted line.

3. The electric generator of claim 1 wherein the line is secured to the rotatable cage by a connector.

4. The electric generator of claim 1 further comprising a platform, wherein the elevation of the platform is adjustable.

5. The electric generator of claim 4 wherein the rotatable cage is placed on the platform to relieve tension on the line, and then the platform is released, leaving the rotatable cage hanging from the line.

6. The electric generator of claim 5 wherein the rotatable cage has a hollow core, and wherein, when the rotatable cage is placed on the platform, the line dangles within the hollow core.

7. The electric generator of claim 1 further comprising one or more fins, wherein the one or more fins are secured to the line, and wherein the one or more fins provide a rotational force to the line.

8. The electric generator of claim 7 wherein liquid pressure deflects the fins to produce the rotational force.

9. The electric generator of claim 7 wherein air pressure deflects the fins to produce the rotational force.

10. The electric generator of claim 1 further comprising a twist controller, wherein the twist controller twists the line.

11. The electric generator of claim 10 further comprising a first clip, wherein the first clip is secured to a proximal portion of the line that is proximal to the rotatable cage and wherein the first clip prevents the rotatable cage from rotating as the line is twisted by the twist controller.

12. The electric generator of claim 11 wherein the first clip is unsecured from the proximal portion of the line, allowing the twisted line to unwind and rotate the rotatable cage.

13. The electric generator of claim 12 further comprising a second clip, wherein the second clip is secured to a distal portion of the line that is distal to the rotatable cage and wherein the second clip prevents the distal portion of the line from rotating when the rotatable cage is rotating.

14. The electric generator of claim 1 wherein the conductive coils are connected to an electrical storage unit to store the generated electricity.

15. An electric generator, comprising a line; a rotatable cage having a plurality of magnets secured to the rotatable cage, wherein the rotatable cage is hanging from the line and wherein the rotatable cage has a hollow core; a connector that secures the line to the rotatable cage; a platform, wherein the elevation of the platform is adjustable; and conductive coils surrounding the rotatable cage, wherein the rotatable cage receives a rotational force causing the rotatable cage to rotate, wherein electricity is generated at the conductive coils when the rotatable cage rotates, wherein the line is twisted, wherein the rotational force on the rotatable cage is produced by the unwinding of the twisted line, wherein the rotatable cage is placed on the platform to relieve tension on the line, and then the platform is released, leaving the rotatable cage hanging from the line, and wherein, when the rotatable cage is placed on the platform, the line dangles within the hollow core.

16. The electric generator of claim 15 further comprising a first clip and a second clip, wherein the first clip is secured to a proximal portion of the line that is proximal to the rotatable cage, wherein the first clip prevents the rotatable cage from rotating as the line is twisted by the twist controller, wherein the first clip is unsecured from the proximal portion of the line, allowing the twisted line to unwind and rotate the rotatable cage, wherein the second clip is secured to a distal portion of the line that is distal to the rotatable cage, and wherein the second clip prevents the distal portion of the line from rotating when the rotatable cage is rotating.

17. The electric generator of claim 1 wherein the conductive coils are connected to an electrical storage unit to store the generated electricity.

18. An electric generator, comprising a line; a rotatable cage having a plurality of magnets secured to the rotatable cage, wherein the rotatable cage is hanging from the line and wherein the rotatable cage has a hollow core; a connector that secures the line to the rotatable cage; a twist controller; a first clip; a second clip; and conductive coils surrounding the rotatable cage, wherein the rotatable cage receives a rotational force causing the rotatable cage to rotate, wherein electricity is generated at the conductive coils when the rotatable cage rotates, wherein the twist controller twists the line, wherein the rotational force on the rotatable cage is produced by the unwinding of the twisted line, wherein, when the rotatable cage is placed on the platform, the line dangles within the hollow core, wherein the first clip is secured to a proximal portion of the line that is proximal to the rotatable cage, wherein the first clip prevents the rotatable cage from rotating as the line is twisted by the twist controller, wherein the first clip is unsecured from the proximal portion of the line, allowing the twisted line to unwind and rotate the rotatable cage, wherein the second clip is secured to a distal portion of the line that is distal to the rotatable cage, wherein the second clip prevents the distal portion of the line from rotating when the rotatable cage is rotating, wherein the conductive coils are connected to an electrical storage unit to store the generated electricity.

\* \* \* \* \*